(12) United States Patent
Ahlén (10) Patent No.: US 10,238,042 B2
(45) Date of Patent: Mar. 26, 2019

(54) GRAIN SWEEP

(71) Applicant: SKANDIA ELEVATOR AB, Vara (SE)

(72) Inventor: Anders Ahlén, Vara (SE)

(73) Assignee: Skandia Elevator AB, Vara (SE)

( * ) Notice: Subject to any disclaimer, the term of this patent is extended or adjusted under 35 U.S.C. 154(b) by 150 days.

(21) Appl. No.: 15/313,533

(22) PCT Filed: May 25, 2015

(86) PCT No.: PCT/SE2015/050600
§ 371 (c)(1),
(2) Date: Nov. 22, 2016

(87) PCT Pub. No.: WO2015/183162
PCT Pub. Date: Dec. 3, 2015

(65) Prior Publication Data
US 2017/0181379 A1    Jun. 29, 2017

(30) Foreign Application Priority Data

May 26, 2014 (SE) ...................................... 1450625

(51) Int. Cl.
*A01F 25/20* (2006.01)
*B65G 65/40* (2006.01)
(Continued)

(52) U.S. Cl.
CPC .......... *A01F 25/2018* (2013.01); *B65G 21/12* (2013.01); *B65G 65/40* (2013.01);
(Continued)

(58) Field of Classification Search
CPC ............ B65G 65/4818; B65G 65/4836; B65G 65/466; B65G 65/4809; B65G 65/425; A01F 25/2018; A01F 25/20
See application file for complete search history.

(56) References Cited

U.S. PATENT DOCUMENTS 2,711,814 A * 6/1955 McCarthy ............ B65G 65/466
198/550.1
3,259,538 A 7/1966 Schnyder
(Continued)

FOREIGN PATENT DOCUMENTS

WO    93/21093 A1    10/1993
WO    2008/148931 A1    12/2008

OTHER PUBLICATIONS

European Search Report dated Dec. 15, 2017 for Application No. 15798801.5 in 10 pages.

*Primary Examiner* — Glenn F Myers
(74) *Attorney, Agent, or Firm* — Knobbe, Martens, Olson & Bear, LLP (57) ABSTRACT

The invention relates to a grain sweep (1) for use on a floor comprising at least a first drive means (2), an elongated frame (3) comprising a rotatably arranged inner end (4) and an outer end (5), a drive wheel (6) adapted to rotate the elongated frame (3) around said inner end (4), and a grain moving means (7) adapted to move grain. The grain sweep (1) further comprises at least one resilient member (8) arranged at either said inner (4) or outer end (5) of said elongated frame (3), wherein the resilient member (8) allows the elongated frame (3) to move from said upper position towards a lower position when pressure is applied upon the elongated frame (3), and wherein the resilient member (8) allows the elongated frame (3) to move back towards said upper position when the pressure is removed.

24 Claims, 5 Drawing Sheets

(51) Int. Cl.
*B65G 65/46* (2006.01)
*B65G 21/12* (2006.01)
*B65G 65/42* (2006.01)

(52) U.S. Cl.
CPC ............ *B65G 65/466* (2013.01); *A01F 25/20* (2013.01); *A01F 2025/2045* (2013.01); *B65G 65/425* (2013.01)

(56) References Cited

U.S. PATENT DOCUMENTS

| | | | |
|---|---|---|---|
| 4,103,788 A | | 8/1978 | Sutton |
| 4,313,705 A | | 2/1982 | Jackson |
| 5,769,590 A | * | 6/1998 | Weikel ................. B65G 65/466 414/319 |
| 5,960,932 A | * | 10/1999 | Adams ................. B65G 65/466 198/550.6 |
| 8,967,937 B2 | * | 3/2015 | Schuelke ............... B65G 65/28 198/735.6 |
| 2005/0183931 A1 | * | 8/2005 | Schaefer ............... B65G 65/466 198/550.1 |
| 2005/0263372 A1 | | 12/2005 | Hollander et al. |
| 2006/0245864 A1 | * | 11/2006 | Epp ....................... B65G 65/466 414/310 |
| 2006/0269383 A1 | | 11/2006 | Lepp et al. |
| 2013/0216340 A1 | | 8/2013 | Luster et al. |
| 2017/0247205 A1 | * | 8/2017 | Hoogestraat ......... B65G 65/466 |

* cited by examiner

Fig 1

GRAIN SWEEP

CROSS-REFERENCE TO RELATED APPLICATIONS

This application is the U.S. National Phase under 35. U.S.C. § 371 of International Application PCT/ES2015/050600, filed May 25, 2015, which claims priority to Swedish Patent Application SE 1450625-7, filed May 26, 2014. The disclosures of the above-described applications are hereby incorporated by reference in their entirety.

TECHNICAL FIELD

The invention relates to a grain sweep for use on a floor or a storage means such as a silo, wherein the grain sweep comprises at least a first drive means, an elongated frame comprising a rotatably arranged inner end and an outer end, a drive wheel adapted to rotate the elongated frame around the inner end, and a grain moving means adapted to move grain.

BACKGROUND ART

For moving granular material such as for instance wheat, oats, rye, barley, shelled or ground corn in bulk, conveyors are generally used. Storage means for such material could for example be a silo or a storage bin. When the storage means are emptied, gravity is first allowed to feed the granular material into an outlet opening at or adjacent the centre of the storage means. A substantial residue forming an inverted cone outward from the opening is left after gravity feeds the majority of the granules into the outlet opening. Grain sweep means are used to convey this residue towards the outlet opening in order to empty the storage means completely. Such grain sweeps are generally radially disposed and movable about the outlet opening to sweep the granules towards the outlet opening. The grain sweeps conventionally comprises an elongated frame along which a grain moving means such as an auger or a paddle conveyor is arranged. The grain moving means will drag or sweep grain towards the opening in the floor, while being rotated around the silo floor.

When the storage means is full of granular material the granular material exert a great load/pressure upon the grain sweep. This load is successively eased as the storage means is emptied from grain through the opening in the silo floor, leaving only the inverted cone of granules substances. The high pressure from a full silo may cause the elongated frame and the grain moving means to bulge and deform which may subsequently affect their operational efficiency. If the elongated frame and grain moving means are deformed to such an extent that they come into contact with the silo floor they will scrape the floor, work inefficiently and be damaged. In addition, the intended path of the grain moving means may be affected by the deformation.

One way to avoid the mentioned deformation of the elongated frame due to the weight of the grain is to provide the elongated frame with a rigid metal elongated hood covering the elongated frame and grain moving means. Such hoods are however often bulky, heavy and expensive to manufacture.

There is thus a need to provide an improved solution to the problems mentioned above.

SUMMARY OF THE INVENTION

An object of this invention is to provide a grain sweep for use on a storage means floor which avoids the problems mentioned above. In particular, it is an object of the invention to prevent the elongated frame of the grain sweep to be deformed under the pressure of a full load of grain in the storage means. This object is achieved by the grain sweep comprising a resilient member, as defined by the technical features of claim 1.

In the application grain is used as an example of a granular material. The invention is not limited to grain but can also be used for other kinds of granular material such as granular foodstuffs (rise, corn etc.) and pellets. It is also possible to use a sweep according to the invention for sand, rock pebbles and similar. The invention is described as a grain sweep but may be used as a more general granular material sweep.

The invention concerns a grain sweep for use on a floor, in particular a storage means floor such as a silo floor. The grain sweep comprises at least a first drive means, an elongated frame comprising a rotatably arranged inner end and an outer end, a drive wheel adapted to rotate the elongated frame around the inner end, a grain moving means adapted to move grain.

The grain sweep further comprises at least one resilient member arranged at either the inner or outer end of the elongated frame, wherein the resilient member allows the elongated frame to move from the upper position towards a lower position when pressure is applied upon the elongated frame, and wherein the resilient member allows the elongated frame to move back towards the upper position when the pressure is removed.

A design having at least one resilient member arranged at either the inner or outer end of the elongated frame, allows the elongated frame to move downward under the weight of the grain when the silo is filling or full without deforming. This is especially important in large silos of large diameter wherein the elongated frame is long and therefore subject to an increased risk of deformation due to that the elongated frame forms a long lever which is attached to both the inner end and the outer end. The resilient member in the inner or outer end allows one end of the elongated frame and a great portion of the elongated frame to move from the upper position towards a lower position, for instance to rest against the floor of the silo, or a support arranged on the floor of the silo. In this position the elongated frame cannot bulge under the pressure exerted by the grain. The end which does not comprise the resilient member may instead experience an elastic deformation or no deformation at all. The elongated frame is not intended to be operated when pressure of the grain of a full silo is exerted. It may therefore rest against the silo floor or on a support.

The floor is usually provided with at least a first outlet opening at or adjacent the centre of the silo. Gravity is allowed to feed the grain into the first outlet opening, leaving a substantial residue forming an inverted cone outward from the first outlet opening. Pressure from the inverted cone on the elongated frame may be removed by opening a second outlet opening located underneath the elongated frame. The pressure of the grain upon the elongated frame lessens upon opening the second outlet opening as grain lying on top of the elongated frame is removed, thereby allowing the elongated frame to move back towards the upper position, in which the grain sweep may be operated. The end of the elongated frame not comprising the resilient member thus returns to its original shape if it experienced an elastic deformation.

The grain sweep may comprise a further resilient member arranged at either the inner or the outer end of the elongated frame. Hence, the inner or outer ends of the elongated frame may be provided with two complementary resilient members. The invention may be extended to any number of resilient members.

The respective resilient member is arranged in connection with either the respective inner or the respective outer end of the elongated frame and with a holding member; such as to allow movement of the elongated frame with respect to the holding member. The holding member is arranged to be in contact with the silo floor when the grain sweep is installed in a silo, such that the holding member maintains a fixed vertical position at all times. The elongated frame is at least partly suspended from the holding members by means of the resilient member. The holding member is arranged to vertically position the respective inner or outer end of the elongated frame. The resilient member is arranged to allow the elongated frame to move in a vertical direction in relation to the holding member.

In one example embodiment the holding member at the outer end of the elongated frame is represented by the drive wheel assembly. In one example embodiment the holding member at the inner end of the elongated frame is represented by the rotary member assembly. The drive wheel assembly comprises the drive wheel, a housing to which the elongated frame is engaged, brackets etc. The rotary member assembly comprises the centre pin around which the grain sweep rotate, an outlet opening, a first drive means, a casing to enclose the mentioned parts etc.

The grain sweep may comprise a resilient member arranged at the inner end or the outer end of the elongated frame and a further resilient member arranged at the other of the inner end or the outer end of the elongated frame. A resilient member at each end of the elongated frame enable the elongated frame to move downward at its inner as well as its outer end simultaneously or independently when pressure is exerted on the elongated frame. Such a design provides improved flexibility in terms of the elongated frame moving between the upper position and a lower position. Also in this design, the inner or outer side of the elongated frame may be provided with two complementary resilient members.

The elongated frame may be arranged to move continuously between the upper and the lower position by means of the resilient member. The elongated frame thereby moves smoothly from the upper position towards the lower position as the pressure increases during the time the silo is filled with grain. Likewise; the elongated frame moves towards its upper position when the silo is emptied.

The resilient member is movable between a first and a second state, and the resilient member is in the first state when the elongated frame is in the upper position. The first and second state may represent the resilient member being in a tense, or compressed, state and in a relaxed state respectively. The resilient member may be in the relaxed state when the elongated frame is in the upper position. In such an example embodiment the resilient member moves from a first state when the elongated frame is in its upper position towards a second state when the elongated frame moves towards its lower position. The upper and lower position of the elongated frame is defined by its vertical relation to the holding member having a fixed vertical position when the grain sweep is installed in a silo.

The elongated frame moves from the upper position when a first predetermined value of the applied pressure is reached. The predetermined value is set such that the elongated frame moves from its upper position when its resistance to pressure is reached, i.e. it moves instead of deforms.

The elongated frame rests against the floor when the elongated frame is in a lowest position. The floor, as mentioned herein, is the floor of the storage means e.g. silo. However, the elongated frame may rest against a fixed support arranged underneath the elongated frame along the floor of the silo when the elongated arm is in its lowest position. The inventive concept is that the elongated frame rests against a fixed structure when in its lowest position, thereby eliminating the risk of deformation. The fixed structure may take different suitable shapes and forms.

The elongated frame reaches the lowest position when a second predetermined value of the applied pressure is reached.

In one aspect of the invention the first drive means is arranged to power the grain moving means, and the grain moving means is arranged to transfer power from the first drive means to the drive wheel. The first drive means may be arranged at the inner end or the outer end.

The drive wheel may also be powered by a second drive means whereas the grain moving means is powered by the first drive means. In such case, the second drive means may be arranged at or adjacent the outer end of the elongated frame. The drive wheel may also for example be powered by hydraulics or electricity.

In one aspect of the invention the drive wheel is arranged at the outer end of the elongated frame. If the grain sweep is placed in a silo or bin, the drive wheel preferably runs along the inside wall of the storage means (silo/bin). The drive wheel may also be arranged at other positions along the elongated frame suitable for moving the elongated frame such that it rotates around the first end and sweeps along the floor of the storage means. For example, the drive wheel may be arranged in between the inner and outer end of the elongated frame.

A second drive wheel may also be arranged along the elongated frame.

In one aspect of the invention the elongated frame moves in relation to the drive wheel when pressure is applied upon the elongated frame such that the drive wheel essentially remains in its vertical position when the elongated frame moves from its upper position.

The drive wheel may comprise contacting parts arranged to be in contact with the floor upon which the drive wheel rests. The contacting parts propel the drive wheel forward such that it moves along the floor in an operable state. Since the contacting parts of the drive wheel is in constant contact with the floor of the silo it is desired that the drive wheel is unaffected by the downwards motion of the elongated frame from its upper position.

In one aspect of the invention the drive wheel moves partly with the elongated frame when pressure is applied upon the elongated frame.

In one aspect of the invention the elongated frame is arranged to rotate around the axis of the drive wheel when pressure is applied upon the elongated frame. The rotation promotes a tilt motion such that the elongated frame tilts forward and downwards towards the floor. The tilting motion is performed in relation to the drive wheel which is fixed in its position in relation to the axis of the drive wheel. Forward is the direction of motion of the drive wheel and is essentially perpendicular to the extension of the elongated frame.

In one aspect of the invention a housing is arranged to cover the drive wheel and the resilient member. The housing is connected to the outer end of the elongated frame. The housing protects the components of the drive wheel and the resilient member, such as bearings, from the grain dust and thus extends the working lifetime of the conveyor.

The housing may be arranged to rotate around the axis of the drive wheel when pressure is applied upon the elongated frame such that the housing tilts forward and downwards towards the floor. The elongated frame, being attached to the housing, therefore rotates with the housing. The housing thereby receives part of the pressure, along with the elongated frame, that causes the elongated arm to move from its upper position towards a lower position.

In one aspect of the invention a first end of the resilient member is engaged to the housing by means of a first pivoting means. An advantage with this is that the resilient member does not deform when the housing rotates around the axis of the drive wheel. Instead the first pivoting means rotates, countering the rotation of the housing.

In one aspect of the invention the grain sweep further comprises a bracket. The bracket is engaged to the axis of the drive wheel. A second end of the resilient member is engaged to the bracket by means of a second pivoting means. The axis of the drive wheel thereby function as a pivot point around which the bracket rotates when pressure is applied to the elongated frame.

The first end of the resilient member being engaged to the housing and the second end of the resilient member being engaged to the bracket allows the housing to shift position, i.e. tilt as the elongated frame moves from its first position, whereas the drive wheel, being arranged to the bracket at its axis, remains in its original position. Thereby the resilient member allows a movement of the housing in respect to the drive wheel without any part of the resilient member or housing being deformed.

As a relative movement between the housing, attached to the elongated frame, and the drive wheel takes place the first and second pivoting means allows the resilient member to remain in an upright position thereby avoiding twisting and turning of the resilient member. Functionality of the resilient member is maintained.

The bracket may further be rotatably engaged to the housing. An engagement point of the bracket to the housing is rotatably arranged at a distance from the axis of the drive wheel such that the bracket acts as a lever when pressure is applied to the elongated frame and the resilient member moves from the first state to the second state. The bracket tilts around the axis of the drive wheel, pushed down by the pressure applied upon the housing to which it is engaged. Simultaneously the housing moves the first pivoting point of the resilient member, thereby changing the state of the resilient member.

In one aspect of the invention the housing is provided with a shoulder arranged to be in contact with the floor when the elongated frame is in its lowest position. The pressure is thereby distributed along the elongated arm as well as the housing.

In the example embodiment where the resilient member is arranged at the inner end of said elongated frame, the second end of the resilient member is rotatably connected to the rotary member assembly via a bracket and the first end of the resilient member is rotatably connected to the elongated frame via an arm, the arm extending in perpendicular direction in relation to the extension of the resilient member and the extension of the elongated frame. The rotary member is connected to the bracket, connected to the resilient member, at an axis around which the bracket is allowed to rotate in a manner similar as described above in conjunction with the resilient member being arranged at the outer end of the elongated frame. The bracket is also allowed to rotate around an engagement point connecting the bracket to the elongated frame. The axis, engagement point, bracket, resilient member, connection to the holding member and connection to the elongated frame correspond in the example where the resilient member is arranged at the inner end of the elongated frame to the respective feature presented in the example where the resilient member is arranged at the outer end of the elongated frame. Their functions and benefits will therefore not be explained in further detail here.

In one aspect of the invention the elongated frame comprises an elongated hood comprising a top panel, a first side panel and a second side panel. The grain moving means is arranged in the interior of the elongated hood. The elongated hood extends in a direction of the extension of the grain moving means. Such a design provides protection of the grain moving means such that it is not exerted to direct pressure from the grain when the silo is full of grain. The air pocket created in the interior of the hood further enable the grain moving means to start when in its upper position without being inhibited by pressure of the remaining grain which would otherwise cover the grain moving means.

The resilient member may be a coil spring. The resilient member may also be another type of spring or another suitable resilient member. Examples of other resilient members include torsion springs, plate springs, extension springs, compression springs, and hydraulic or gas operated springs.

The resilient member may be arranged in vertical or horizontal direction with respect to the silo floor once the grain sweep is installed in the silo. Depending on the construction of the grain sweep, the resilient member may also be arranged in a position between a vertical and horizontal position.

In one aspect of the invention the grain sweep further comprises adjustment means arranged to control the vertical position of the elongated frame in the upper position. The adjustment means may for example set the degree of compression of the resilient member in the first state. The adjustment means is preferably arranged to be accessible outside the housing, such that the vertical position of the elongated frame in first position is easily controlled. The adjustment means control the vertical position of the housing, and thereby the distance of the elongated frame above the bottom of the storage means, i.e. the upper position. The upper position of the elongated frame is set in relation to the bottom of the storage means, e.g. the floor of a silo, such that the grain moving means can move the grain from the bottom of the storage means towards a first outlet opening arranged close to the centre of the storage means.

The expressions like upper, lower, inner and outer used herein refers to directions in relation to a grain sweep installed in a silo, i.e. a grain sweep as intended to be used in a silo.

BRIEF DESCRIPTION OF THE DRAWINGS

The present invention will now be described in detail with reference to the figures, wherein:

FIG. 4 a-b shows, in a cross sectional side view, the outer end of the elongated frame and the housing of a grain sweep according to the invention, and FIG. 5a-5b shows, in perspective view, a part of the grain sweep according to the invention.

DETAILED DESCRIPTION

In the description of the invention given below reference is made to the following figures in which two embodiments are exemplified. The invention is however not limited to the embodiments shown in the figures, and the figures are simply to be seen as ways of illustrating two modes of the invention.

Figure 1:
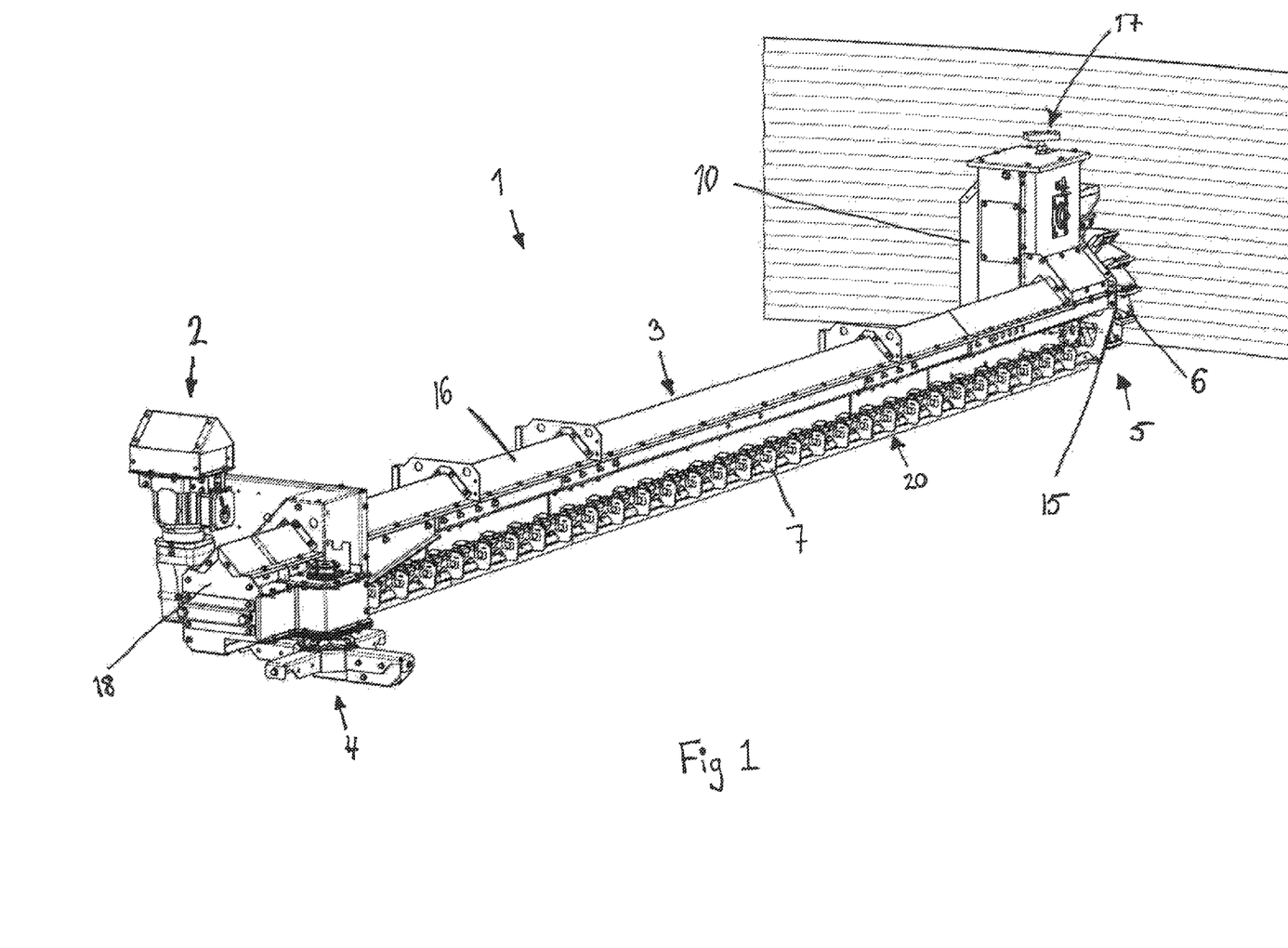
FIG. 1 shows, in perspective view, a grain sweep according to the invention.

FIG. 1 shows a grain sweep 1 for use on the floor of a silo or another storage means (not shown). The grain sweep 1 comprises an elongated frame 3 extending between an inner end 4, arranged towards the centre of the silo in which the grain sweep 1 is intended to be installed, and an outer end 5, arranged towards the outer wall of the silo in which the grain sweep 1 is intended to be installed. A first drive means 2, for instance an electric motor or a hydraulic motor, is arranged at the inner end 4 of the elongated frame 3. The first drive means 2 is arranged to drive a grain moving means 7, a paddle conveyor in this example, by means of a first sprocket (not shown). The invention is applicable not only to paddle conveyors but can be easily adapted to for instance auger conveyors by adapting the drive means to the auger conveyor.

The first drive means 2 and the first sprocket are enclosed by a casing 18, wherein the casing 18 is engaged to the elongated frame 103 adjacent the inner end 4. A second sprocket 19 is arranged at the outer end 5 of the elongated frame 1. The paddle conveyor consists of an endless chain, extending between the first and the second sprocket 19, and a plurality of spaced apart paddles 20 attached to the chain. The second sprocket 19 indirectly powers the rotation of a drive wheel 6 adapted to rotate the elongated frame 3 around the inner end 4, i.e. the drive wheel 6 is arranged to move the outer end 5 of the elongated frame 3 such that the elongated frame 3 sweep along an intended path of rotation around the inner end 4 of the elongated frame 3.

In FIG. 1 the elongated frame 3, and thereby the grain moving means 7, is arranged in an upper position. In the upper position the elongated frame 3 is arranged at a distance from the floor such that neither the elongated frame 3 nor the paddles 20 of the grain moving means 7 are in contact with the silo floor (not shown). The upper position allows the elongated frame 3 to freely sweep the silo floor while moving along a rotational path, i.e. to rotate along the floor while the paddles 20 move grain towards a first outlet opening in the floor placed adjacent the centre of the silo (not shown).

The elongated frame 3 is provided with a hood 16 with a top panel and side walls. The side wall facing the grain to be conveyed does not reach down to the floor of the storage means, whereas the other as far as possible goes all the way down when the elongated frame is in its lower position.

The second sprocket 19 is connected to the axis 9 of the drive wheel 6 such as to propel the drive wheel 6 via backstops 21 and resilient means 22 such as to allow the drive wheel to rotate in one direction only. Such drive mechanism set-ups are known in the art. The axis 9 of the drive wheel 6 is thereby unaffected by the movement of the elongated frame 3 at which the second sprocket 19 is engaged, thereby allowing the second sprocket 19 to move with the elongated frame 3 when a pressure is applied to the elongated frame 3 while allowing the axis 9 of the drive wheel 6 to remain still in its position, as shown in FIG. 2.

Figure 2:
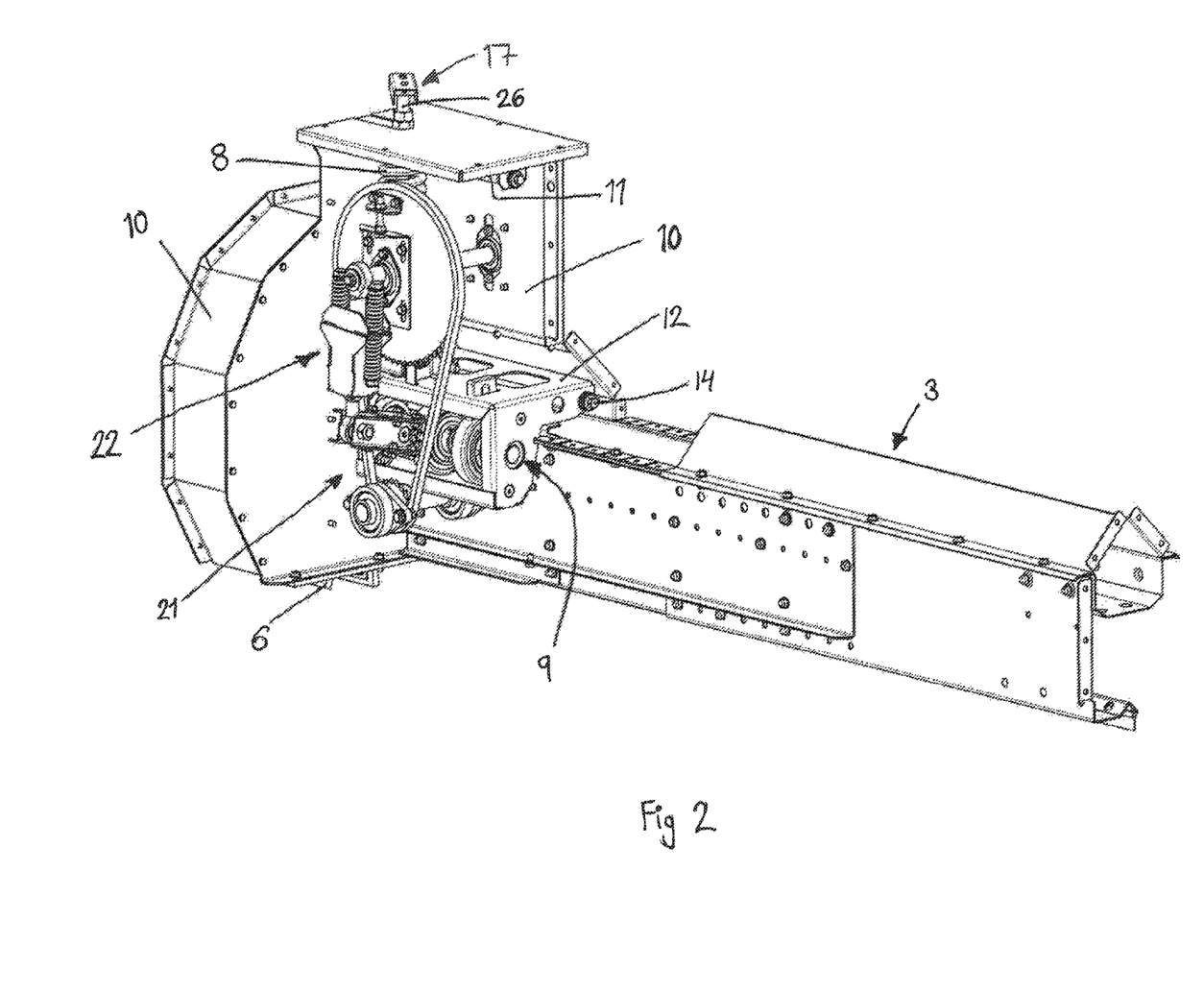
FIG. 2 shows, in perspective view, a part of the grain sweep according to FIG. 1.

Part of the housing 10, covering the axis 9, drive wheel 6, second sprocket 19 etc, is omitted from FIG. 2 for visual purposes.

Figure 3:
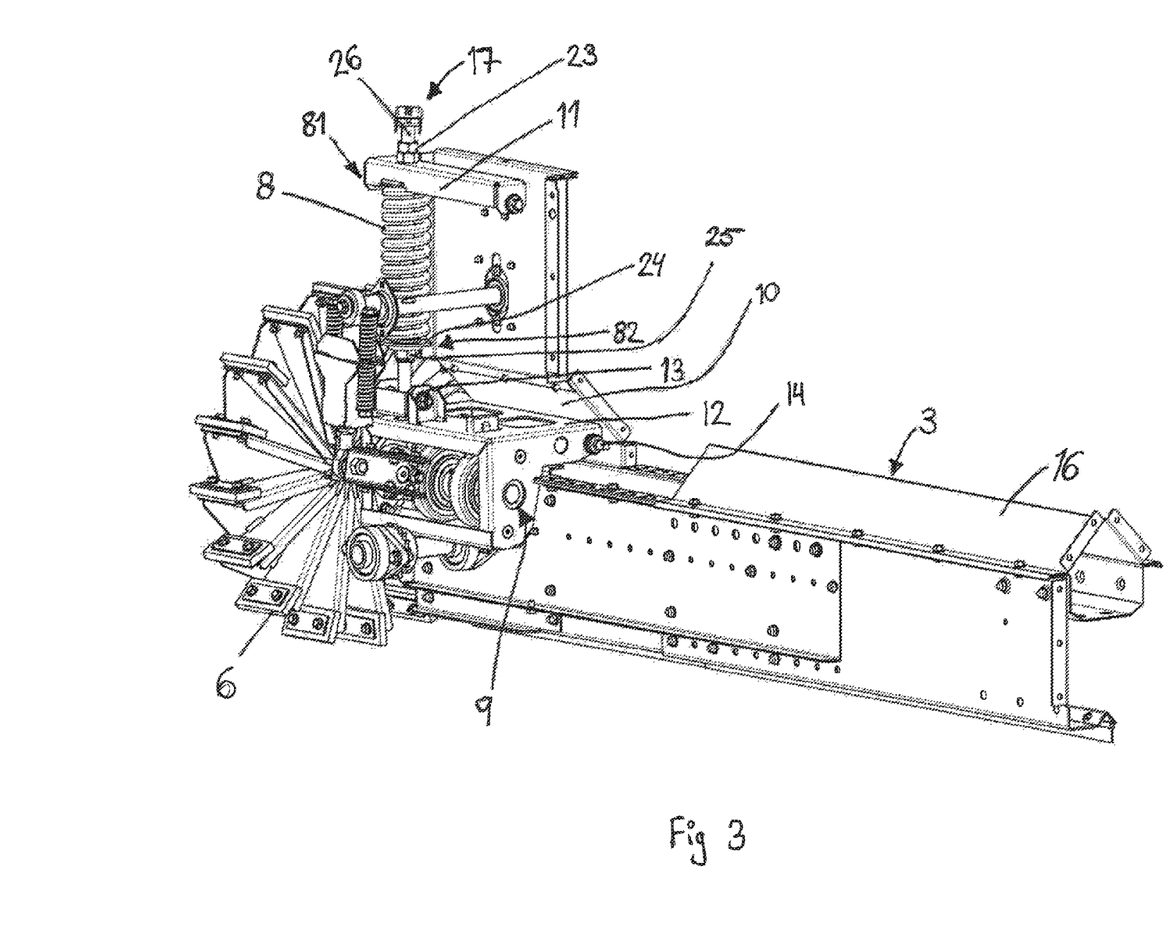
FIG. 3 shows, in perspective view, a part of the grain sweep according to FIG. 1.

In FIG. 3, most of the housing 10 and part of the drive wheel 6 propulsion set-up is removed to expose a resilient member 8 in the form of a coil spring. A first end 81 of the resilient means 8 is connected to the housing 10 via a first pivoting means 11. The pivoting means 11 is rotatably arranged in the housing 10 thereby allowing the resilient member 8 to remain in an essentially vertical position while the housing 10 rotates due to pressure exerted by the grain of the full silo. A threaded rod 26 runs through the centre of the coil of the resilient member 8. A first locking nut 23 is arranged on the threaded rod 26 in a position above the housing 10, such that the essentially vertical position of the threaded rod 26 in relation to the housing 10 is controlled. The threaded rod 26 is provided with an adjustment means 17, in the form of a turnable handle, in a position above the first locking nut 23.

The second end 82 of the resilient member 8 is connected to a washer 24. The washer 24 is locked against the threaded rod 26 by means of a second locking nut 25 arranged on the threaded rod 26 underneath the washer 24.

The lower part of the threaded rod 26 is connected to a second pivoting means 13, for instance in the form of a nut rotatably arranged inside a nut housing, wherein the second pivoting means 13 is rotatably connected to the bracket 12. The nut has two axle parts soldered to it. The axle parts are in turn rotatably arranged in the nut housing which in turn is attached to the bracket 12. The bracket 12, being rotatably connected to the axis 9 of the drive wheel 6 and rotatably connected to the housing 10 via an engagement point 14, is allowed to pivot as pressure is applied to the housing 10 and to the elongated frame 3. This is further illustrated below. The second pivoting means 13 thereby allows the resilient member 8 to stay in an essentially vertically upright position at all times.

Figure 4A:
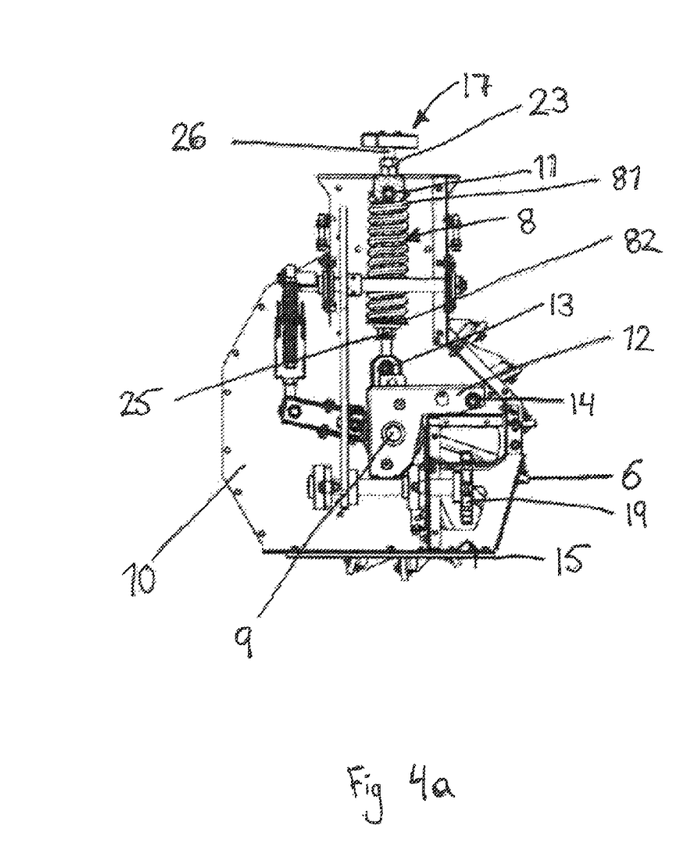
Figure 4B:
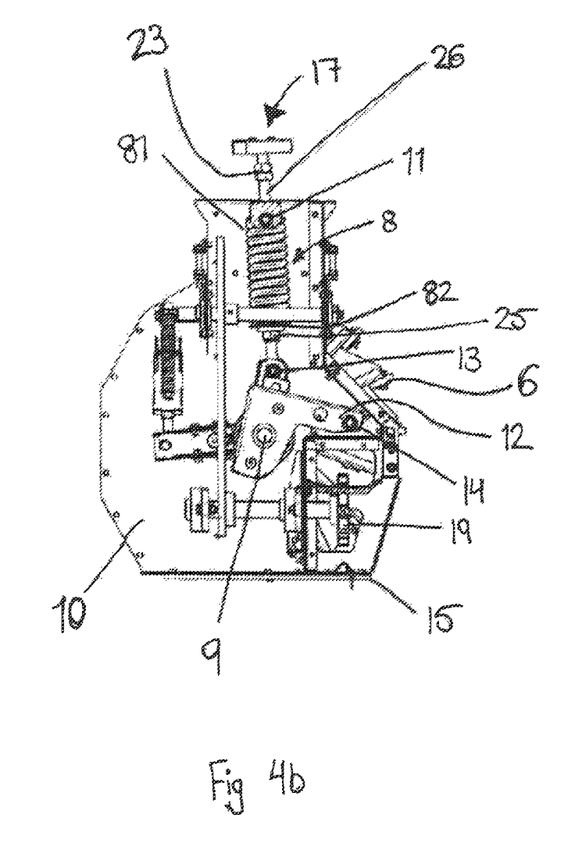

FIGS. 4a and 4b shows, in a cross sectional side view, the outer end of the elongated frame and the housing of a grain sweep according to the invention.

FIG. 4a shows cross section views towards the outer end of the elongated frame 3. In FIG. 4a, the elongated frame 3 is arranged in its upper position as no pressure or a pressure below a predetermined first level is applied to the elongated frame 3 or to the housing 10. The shoulder 15 of the housing 10 is therefore arranged above floor level. The resilient member 8 is in a first state, non-compressed coil, and the first locking nut 23 is resting against the housing 10.

In FIG. 4b, pressure of grain has forced the elongated frame 3 into its lower position and pushed the housing 10 downwards. The pressure has exceeded the second predetermined level and the shoulder 15 of the housing 10 rests against the floor of the silo. The housing 10 has subsequently rotated the bracket 12 around the axis of the drive wheel 9, the engagement point 14 functioning as a lever for the movement of the bracket 12. The engagement point 14 is in a lower position in relation to the axis 9 of the drive wheel compared to its position in FIG. 4a. The resilient member 8 is compressed into its second state as the housing 10, with the first pivoting means 11 attached to it, moves downwards. The locking nut 23 is no longer in contact with the housing 10 due to the movement of the housing 10 and elongated frame 3.

When the pressure in the silo is lessened, for instance by opening the first and second outlet openings in the bottom of the silo; the resilient member 8 returns to its first state, as seen in FIG. 4a, and the elongated frame 3 moves back to its upper position as the pressure drops below the first predetermined level. The locking nut 23 returns into contact with the housing 10, thereby controlling the tension of the resilient member 8 in its first position and subsequently the vertical position of the housing 10 and the elongated frame 3 in its upper position.

The fact that the threaded rod 26 is arranged by means of nuts or running freely in the first and second pivoting means 11, 13, the position of the entire housing 10 and thereby the distance between the elongated frame and the silo floor can be set by turning the turnable handle.

Figure 5A:
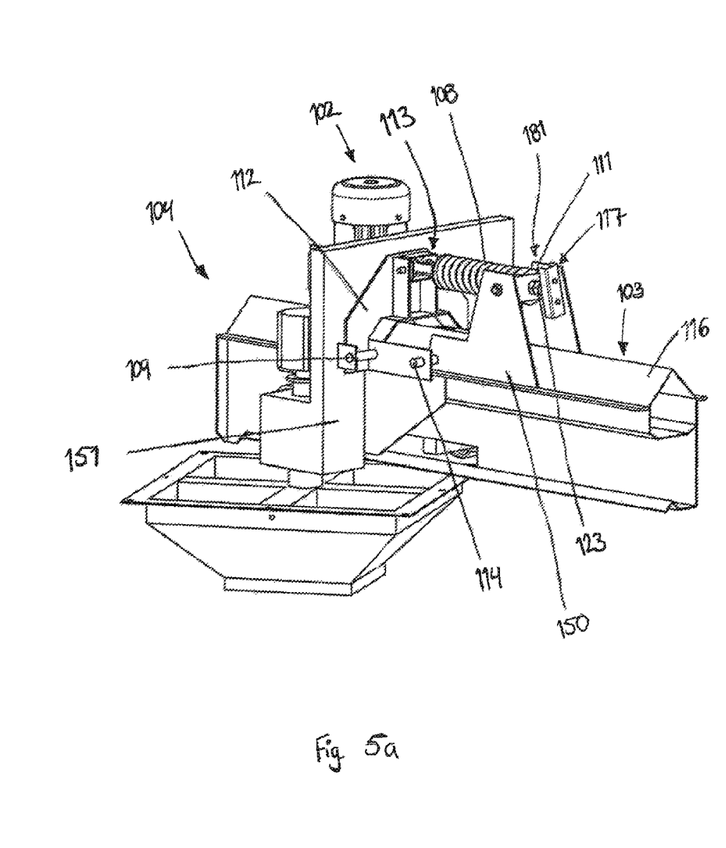
Figure 5B:
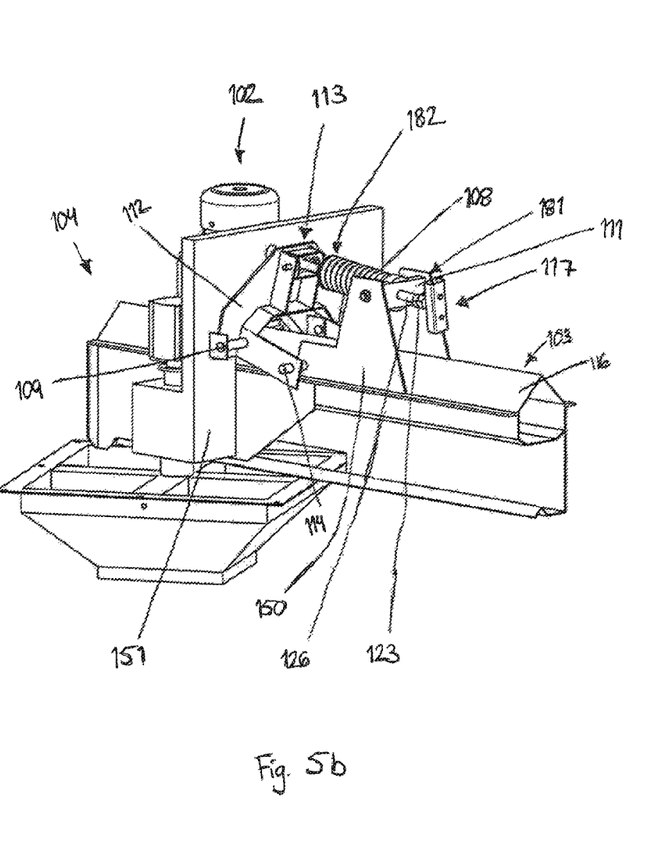

FIGS. 5a and 5b shows an example of an inner end 104 of an elongated frame 103 which comprises an elongated hood 116, the inner end 104 being arranged towards the centre of the silo in which the grain sweep 1 is intended to be installed. The inner end 104 is engaged to a rotary member assembly comprising an outlet opening and a central rotation point around which the grain sweep is allowed to rotate, via the rotary member 151. The inner end 104 is provided with a resilient member 108 and a first drive means 102 is arranged at the inner end 104 of the elongated frame 103.

The resilient member 108 allows the elongated frame 103 to move from an upper position towards a lower position when pressure is applied upon the elongated frame 103, and allows the elongated frame 103 to move back towards the upper position when the pressure is removed. The upper position is illustrated in FIG. 5a and the lower position is illustrated in FIG. 5b.

A first end 181 of the resilient means 108 is rotatably connected to an arm 150 via a first pivoting means 111. The arm 150 is engaged to the elongated frame 103, and extends in perpendicular direction in relation to the extension of the resilient member 108 and the extension of the elongated frame 103. The resilient member 108 is indirectly connected to the elongated frame 103 by means of the arm 150. The first pivoting means 111 is rotatably arranged in connection with the arm 150 thereby allowing the resilient member 108 to remain in an essentially horizontal position while the elongated frame 103 moves towards its second position due to pressure exerted by the grain of the full silo. A threaded rod 126 runs through the centre of the coil of the resilient member 108. A first locking nut 123 is arranged on the threaded rod 126. The threaded rod 126 is provided with an adjustment means 117, in the form of a turnable handle, in a position adjacent the first locking nut 123.

The second end 182 of the resilient member 108 is connected to a washer (not shown). The washer is locked against the threaded rod 126 by means of a second locking nut (not shown) arranged on the threaded rod 126 on opposite side of the washer in relation to the coil. The coil of the resilient member 108 is in contact with the first pivoting means 111, and the compression of the coil against the first pivoting means 111 is adjustable by means of the adjustment means 117 by reducing the distance of the threaded rod 126 between the first pivoting means 111 at the first end of the resilient member 108 and the washer and the second end of the resilient member 108.

The part of the threaded rod 126 adjacent the second end 182 is connected to a second pivoting means 113, for instance in the form of a nut rotatably arranged inside a nut housing, wherein the second pivoting means 113 is rotatably connected to the bracket 112. The nut has two axle parts soldered to it. The axle parts are in turn rotatably arranged in the nut housing, which in turn is attached to the bracket 112. The bracket 112, being rotatably connected to the axis 109 of the rotary member 151 and rotatably connected to the elongated frame 103 via an engagement point 114, is allowed to pivot as pressure is applied to the elongated frame 103. The second pivoting means 113 thereby allows the resilient member 108 to stay in an essentially horizontal position at all times.

The resilient member 108 is movable between a first and a second state. In FIG. 5a the elongated frame is in the upper position and the resilient member 108 is in the first state, being relaxed. In FIG. 5b a weight load is applied to the elongated frame 103, forcing the elongated frame to move towards the lower position. The bracket 112 rotates around the engagement point 114 and forces the resilient member 108 to move into its second state, being compressed.

As an illustrative example a storage means in form of a silo can be 16 m in diameter and 25 m high. Such a silo has a 5000 m$^3$ capacity. Grain material will exit the silo upon opening the outlet opening, thereby creating an inverted cone of about 1000 m$^3$ with an angle of repose of 45 degrees.

Wheat whey about 750 kg/m$^3$ and oats whey about 600 kg/m$^3$. As an example; wheat of a full silo weighs about 3750 metric tons. Granular material of 25 m height exerts a pressure of about 200 kPa. Such a pressure is well above both the first and second predetermined levels and causes the elongated arm to rest against the silo floor in its lowest position. The inverted cone, formed by the wheat left in the silo after the first outlet opening is opened, weighs about 750 metric tons. When the grain material starts to exit the silo through the second outlet opening the pressure is continuously lowered and the elongated frame will eventually start to move towards its upper position when the pressure drops below the second predetermined level.

The grain sweep may be operable when the elongated frame is at its lowest position when pressure from the full silo is lowered even when the pressure is above the second predetermined value. The grain sweep is operable when the elongated frame is in the continuous positions between its lowest position and its upper position. The grain moving means of the elongated frame acts upon the grain of the inverted cone in order to move the grain material towards the first outlet opening. The grain sweep is operable when the elongated frame is in its upper position.

The first and second predetermined values for when the elongated frame starts to move from its upper position and for when the elongated frame rests against said floor in its lower position respectively, are determined by for instance the length of the elongated frame, the granular material in the storage means and other design factors.

The embodiments described above are intended to illustrate one way of positioning the resilient member at the inner and outer ends of a grain sweep. The orientation of the respective parts of the invention can be varied relative to one another, while the function of the invention is still achieved.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description are to be regarded as illustrative in nature, and not restrictive.

What is claimed is:
1. A grain sweep for use on a floor comprising:
at least a first motor,
an elongated frame comprising a rotatably arranged inner end and an outer end, a drive wheel adapted to rotate the elongated frame around said inner end,
a conveyor adapted to move grain,
at least one resilient member arranged at either said inner or outer end of said elongated frame,
wherein the resilient member allows the elongated frame to move from an upper position towards a lower position when pressure is applied upon the elongated frame,
wherein the resilient member allows the elongated frame to move back towards said upper position when the pressure is removed,
wherein a first end of said resilient member is directly or indirectly rotatably connected to either the inner or the outer end of the elongated frame and a second end of the resilient member is rotatably connected to a holding member, and wherein the resilient member allow the elongated frame to move with respect to the holding member, and
wherein the elongated frame moves in relation to said holding member when pressure is applied upon the elongated frame such that said holding member essentially remains in its vertical position when the elongated frame moves from its upper position.

2. The grain sweep according to claim 1, wherein the grain sweep comprises a further resilient member arranged at either said inner or said outer end of said elongated frame.

3. The grain sweep according to claim 2, wherein the grain sweep comprises said resilient member arranged at said inner end or said outer end of said elongated frame and a further resilient member arranged at the other of said inner end or said outer end of said elongated frame.

4. The grain sweep according to claim 1, wherein the elongated frame is arranged to move continuously between said upper and said lower position by means of said resilient member(s).

5. The grain sweep according to claim 1, wherein the resilient member is movable between a first and a second state, and wherein the resilient member is in said first state when the elongated frame is in said upper position.

6. The grain sweep according to claim 1, wherein said elongated frame moves from said upper position when a first predetermined value of said applied pressure is reached.

7. The grain sweep according to claim 1, wherein the elongated frame rests against said floor when the elongated frame is in a lowest position.

8. The grain sweep according to claim 7, wherein said elongated frame reaches said lowest position when a second predetermined value of said applied pressure is reached.

9. The grain sweep according to claim 1, wherein said holding member is in contact with the floor of a silo when the grain sweep is installed in a silo, such as to maintain a fixed vertical position in respect to the floor of said silo.

10. The grain sweep according to claim 1, wherein the holding member is either a rotary member assembly arranged at said inner end or said drive wheel arranged at said outer end of the elongated frame.

11. The grain sweep according to claim 1, wherein a first end of said resilient member is directly or indirectly rotatably connected to said elongated frame by a first pivot joint.

12. The grain sweep according to claim 1, wherein said first motor is arranged to power the conveyor, and wherein the grain conveyor is arranged to transfer power from said first motor to said drive wheel, and said drive wheel is arranged at said outer end of said elongated frame.

13. The grain sweep according to claim 1, wherein the elongated frame is arranged to rotate around an axis of said holding member when pressure is applied upon the elongated frame such that the elongated frame tilts downwards towards the floor.

14. The grain sweep according to claim 1, wherein a housing is arranged to cover said drive wheel and said resilient member, and wherein the housing is connected to said outer end of said elongated frame.

15. The grain sweep according to claim 1 further comprising a bracket,
wherein said bracket is rotatably engaged to an axis of said holding member and
wherein a second end of said resilient member is rotatably engaged to said bracket by means of a second pivot joint.

16. The grain sweep according to claim 1, wherein said elongated frame comprises an elongated hood comprising a top panel, a first side panel and a second side panel and wherein said conveyor is arranged in the interior of said elongated hood and wherein the elongated hood extends in a direction of the extension of the conveyor.

17. The grain sweep according to claim 1, wherein the resilient member is a coil spring.

18. The grain sweep according to claim 1 further comprising adjustment means arranged to control the vertical position of said elongated frame in said upper position.

19. The grain sweep according to claim 1, wherein a housing is arranged to cover said drive wheel and said resilient member, and wherein said outer end of said elongated frame is connected to the housing, and wherein the first end of the resilient member is connected to the elongated frame via the housing.

20. The grain sweep according to claim 19, wherein said housing is provided with a shoulder arranged to be in contact with the floor when the elongated frame is in its lowest position.

21. The grain sweep according to claim 10, wherein the said inner end of said elongated frame is connected to the rotary member assembly and wherein the first end of the resilient member is connected to the elongated frame via an arm.

22. A grain sweep for use on a floor, comprising:
at least a first motor,
an elongated frame comprising a rotatably arranged inner end and an outer end,
a drive wheel adapted to rotate the elongated frame around said inner end,
a conveyor adapted to move grain,
at least one resilient member arranged at either said inner or outer end of said elongated frame, and
a bracket, wherein said bracket is rotatably engaged to an axis of said holding member,
wherein a second end of said resilient member is rotatably engaged to said bracket by means of a second pivot joint
wherein the resilient member allows the elongated frame to move from an upper position towards a lower position when pressure is applied upon the elongated frame,
wherein the resilient member allows the elongated frame to move back towards said upper position when the pressure is removed, and
wherein said bracket is further engaged to said housing or elongated frame.

23. The grain sweep according to claim 22, wherein an engagement point of said bracket to said housing or elongated frame is arranged at a distance from the axis of the drive wheel or rotary member assembly such that the bracket acts as a lever when pressure is applied to the elongated frame and the resilient member moves from said first state to said second state.

24. A grain sweep for use on a floor, comprising:
   at least a first motor,
   an elongated frame comprising a rotatably arranged inner end and an outer end,
   a drive wheel adapted to rotate the elongated frame around said inner end,
   a conveyor adapted to move grain,
   at least one resilient member arranged at either said inner or outer end of said elongated frame,
   wherein the resilient member allows the elongated frame to move from an upper position towards a lower position when pressure is applied upon the elongated frame,
   wherein the resilient member allows the elongated frame to move back towards said upper position when the pressure is removed,
   wherein a housing is arranged to cover said drive wheel and said resilient member, and wherein said outer end of said elongated frame is connected to the housing, and wherein the first end of the resilient member is connected to the elongated frame via the housing, and
   wherein the housing is arranged to rotate around from the axis of the drive wheel when pressure is applied upon the elongated frame such that the housing tilts forward and downwards towards the floor.

* * * * *